No. 680,958. Patented Aug. 20, 1901.
W. A. BARRINGTON.
DISTILLATION COFFEE POT.
(Application filed Nov. 10, 1900.)
(No Model.) 2 Sheets—Sheet 1.
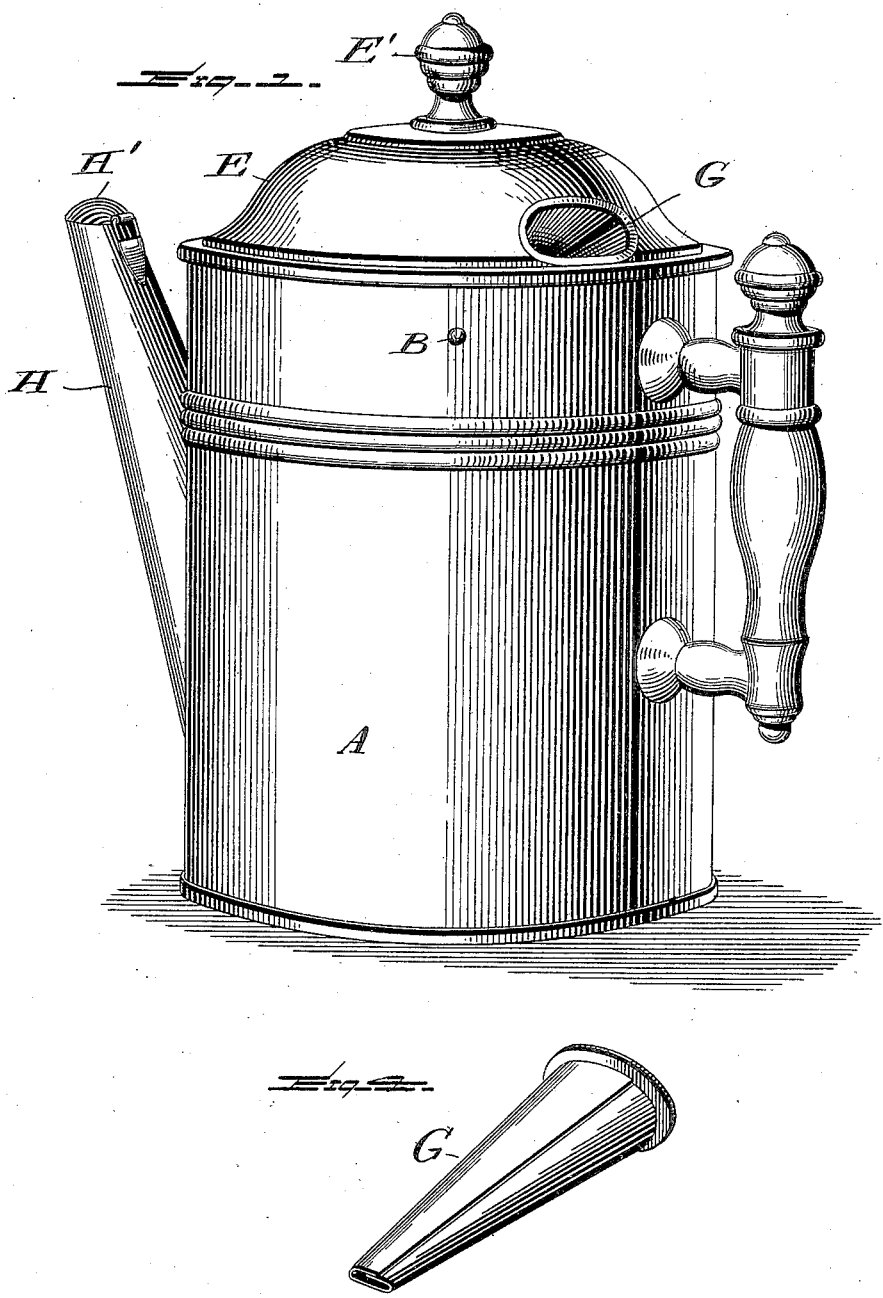
WITNESSES:
L. C. Hills
Alfred T. Gage
INVENTOR:
William A. Barrington,
BY E. B. Stocking
Attorney No. 680,958. Patented Aug. 20, 1901.
W. A. BARRINGTON.
DISTILLATION COFFEE POT.
(Application filed Nov. 10, 1900.)
(No Model.) 2 Sheets—Sheet 2.
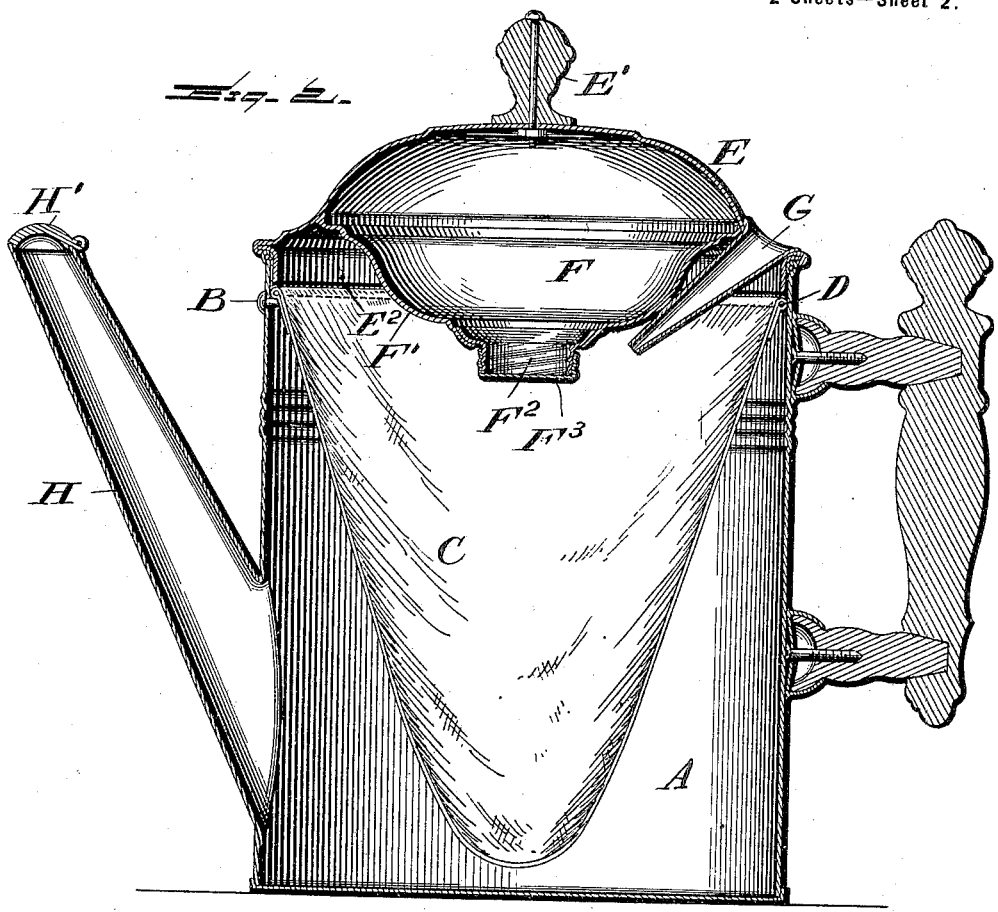
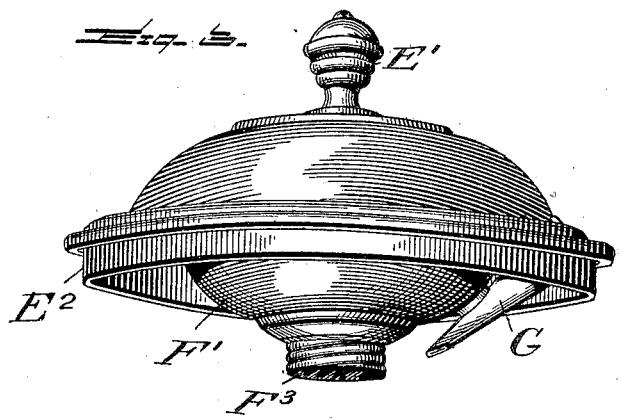
WITNESSES:
L. C. Hills
Alfred T. Gage
INVENTOR:
William A. Barrington
BY E. B. Stocking
Attorney
THE NORRIS PETERS CO., PHOTO-LITHO., WASHINGTON, D. C.

UNITED STATES PATENT OFFICE.

WILLIAM A. BARRINGTON, OF LOUISVILLE, KENTUCKY.

DISTILLATION COFFEE-POT.

SPECIFICATION forming part of Letters Patent No. 680,958, dated August 20, 1901.

Application filed November 10, 1900. Serial No. 36,089. (No model.)

*To all whom it may concern:*

Be it known that I, WILLIAM A. BARRINGTON, a citizen of the United States, residing at Louisville, in the county of Jefferson, State of Kentucky, have invented certain new and useful Improvements in Distillation Coffee-Pots, of which the following is a specification, reference being had therein to the accompanying drawings.

This invention relates to coffee-pots; and it has for its principal object the provision of means for making an infusion of coffee by the process of distillation.

In all the processes of making coffee in which the admixture of water and ground coffee is boiled, steeped, or dripped the resultant liquid is, properly speaking, a decoction having in solution the deleterious constituents of coffee, including tannic acid, while the finer exceedingly-volatile essential oils from which are derived excellence of flavor and aroma and the stimulating element derived from caffein are vaporized and lost in the escaping steam evolved by such processes. By the process of distillation the action is not so vigorous as to liberate or separate the deleterious qualities, and the resultant liquid is an infusion which contains only the more desirable constituents which yield excellence of flavor, aroma, and stimulus. The essential point is therefore to avoid excessive cooking and to condense the vapor which arises from the admixture and return the said vapor in liquid form to the infusion. This can be accomplished by practicing what is known as "distillation," and the object of my invention, as before stated, is to provide means whereby this process may be executed in a coffee-pot. My invention provides such a pot, which is also extremely simple in construction, accessible in all its parts and surfaces for cleaning purposes, devoid of crevices, corners, or surfaces liable to collect or retain as a deposit or coating sediments or impurities tending to vitiate succeeding infusions made therein. It also exposes a comparatively large condensing-surface and is provided with a compact condensing-chamber, from which in the act of pouring coffee from the pot no escape of water therefrom can occur, while the location and arrangement of said chamber are practically confined to the cover of the pot, whereby the interior of its body portion is not thereby reduced in capacity, nor is accessibility thereto impeded.

Further objects and advantages of the invention will appear in the following description and the novel features thereof will be particularly pointed out in the claims.

Referring to the drawings, Figure 1 is a perspective of a coffee-pot provided with my invention. Fig. 2 is a central vertical section. Fig. 3 is a perspective of the cover and condensing-chamber, and Fig. 4 is a detailed perspective of the water-supply tube.

A represents the body portion of the pot, which portion may be of any well-known construction and outline. Within the body portion and upon suitable means, such as inwardly-projecting studs B, is supported a filter C, made of suitable textile material in bag form and having an expanding-ring D, of wire, inclosed in the upper edge or mouth of the bag or filter. This edge with the ring therein rests upon the studs, while the bottom of the filter preferably reaches (though not necessarily) nearly to the bottom of the pot.

E is the cover, having the usual lifting-knob $E'$ and flange $E^2$, fitted inside of the body A, the cover being either hinged to or entirely separable from the body, as desired. The general outline of the cover E is bell-shaped, and beneath and to it is secured a similarly-shaped wall $F'$, which constitutes the bottom of the condensing-chamber F, and in or on the bottom is fitted a threaded nipple $F^2$ and a threaded cap $F^3$ for the same.

G is a receiving, regulating, and directing tube for the introduction of hot water to the central portion of the filter C. The tube G is also mounted on the cover by passing the same through an opening therein, and it may be secured to the bottom of the condensing-chamber by solder or otherwise. The outer end of the tube for a finished appearance may be folded against the cover and soldered or not, as desired. The inner end of the tube is materially contracted, as shown, so that hot water introduced therethrough must be slowly introduced. This simply and positively secured slow introduction of the hot water is an important point, as it insures perfect percolation, and the delivery of the hot water at approximately the center of the filter has its advantages.

It being understood that the pouring-spout H is provided with a cover H' and that the cover E is fitted to the body, as in ordinary coffee-pots, there is no escape of steam or vapor from the interior of the pot, because the extended condensing-surface acts immediately and effectively to condense all rising vapor or steam, so that no dependence is required upon a very tightly fitting cover to the pot.

It will be seen that an opening into the top of the chamber F, fitted with an ordinary loose cover, would permit leakage of the cold water when pouring coffee from the spout H, and in such case also the chamber could not be completely filled; but only such quantity as could be held below and at one side of such opening in the top could be put in the chamber. By locating the opening at the bottom of the chamber such leakage cannot occur and the chamber can be entirely filled, thus providing a larger body of cold water and effecting a more prompt and perfect condensation of steam and vapors. Furthermore, as the water cools after each successive use the same body of cold water may be used for a long time.

A further and important advantage secured by placing a filling-opening in the bottom of the condensing-chamber instead of the top is that said opening must of necessity be tightly closed to prevent the escapement of cold water therefrom, so as to fall directly upon the coffee below. When a filling-opening is located on the top, as heretofore, carelessness on the part of servants often results in the partial closure of the opening, whereby the water evaporates or leaks out when pouring coffee, and thus requires more frequent supplies of fresh water than when located in the bottom.

The manner of use and operation are as follows: A charge of ground coffee is deposited in the filter C, the chamber F filled with cold water, the cover E closed down upon the body, and a suitable quantity of hot water is introduced at the tube G, which directs the hot water toward the center of the filter and of the mass of coffee therein, whereby thorough percolation is secured, and no water passes directly through the filter without contact with the coffee. Steam or vapor at once rises, carrying with it the finer and more volatile oils of the coffee, and the vapor contacts with the cool bottom of the chamber F and is immediately condensed and falls in substantially a liquid form to the infusion being produced, thus retaining therein the fine flavor of the coffee. This completes the process. None of the grosser qualities are liberated by an excessive or prolonged treatment like steeping, boiling, or dripping.

From the foregoing it will be seen that compactness with an extended condensing-surface, accessibility for cleansing with avoidance of lodgments for sediment, control of hot-water supply, and preservation of aroma and flavor are all secured by a simple economic construction.

It is apparent that variations in general outline, proportions, and details of construction may be made by those skilled in the art without a departure from my invention, and I therefore do not limit the same to exactly those herein shown and described.

What I claim is—

1. A distillation coffee-pot comprising a body portion having a pouring-spout and an imperforate cover forming the upper wall of a condensing-chamber, the lower wall of which is provided with a filling-orifice and with means for closing the same, substantially as and for the purposes specified.

2. A distillation coffee-pot comprising a body portion having a pouring-spout and an imperforate cover forming the upper wall of a condensing-chamber, the lower wall of which is secured to the upper wall and provided with a filling-opening and a closure therefor, and a filling-tube supported in the top of the cover, directed toward and ending near the center thereof and contracted at its inner end; substantially as and for the purpose specified.

3. A distillation coffee-pot comprising a body portion having a pouring-spout and an imperforate cover having a condensing-chamber therein, the lower wall of which is provided with a filling-orifice and with means for closing the same, substantially as and for the purpose specified.

In testimony whereof I affix my signature in presence of two witnesses.

WILLIAM A. BARRINGTON.

Witnesses:
 E. B. STOCKING,
 ALFRED T. GAGE.